Sept. 22, 1959     B. S. AIKMAN     2,904,960
PULSATING BRAKE APPARATUS
Filed Sept. 7, 1956
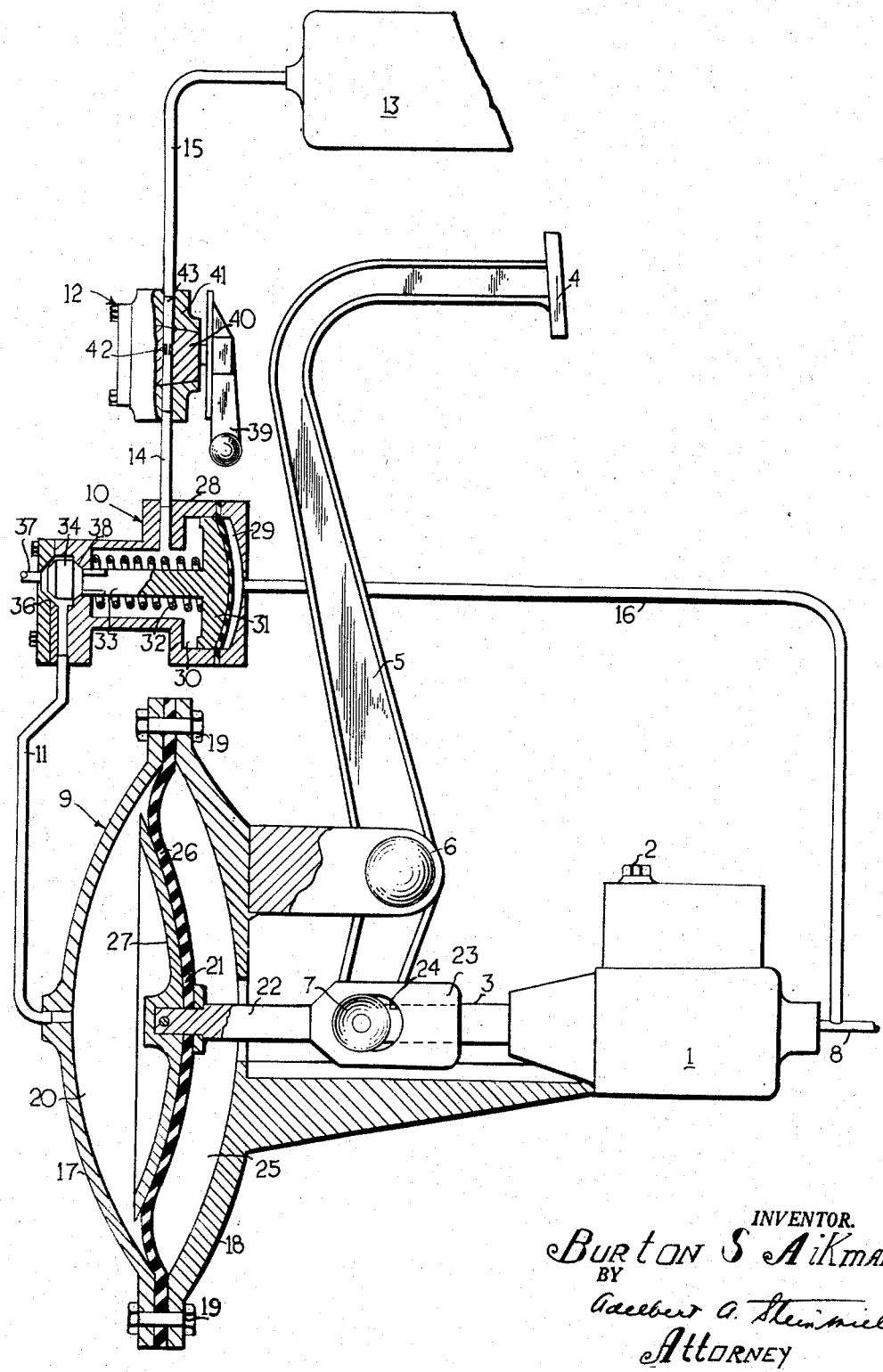
INVENTOR.
Burton S Aikman
BY
Adelbert A. Steinmiller
Attorney

2,904,960
PULSATING BRAKE APPARATUS

Burton S. Aikman, St. Petersburg, Fla., assignor to Westinghouse Air Brake Company, Wilmerding, Pa., a corporation of Pennsylvania Application September 7, 1956, Serial No. 608,632

7 Claims. (Cl. 60—54.6)

This invention relates to brake control apparatus and more particularly to automotive brake control apparatus of the type employed on large trucks or similar vehicles.

In operation of automotive type brakes on slippery surfaces, it has been found to be true that a sliding wheel has the tendency to slip sideways, a condition that often has dangerous results. Various devices and types of apparatus have heretofore been proposed for preventing sliding or locking of automotive wheels; however, such devices have proved to be of high cost of construction and installation and often very complex in construction.

It is the principal object of my invention to provide an inexpensive brake control apparatus which effects automatically a pulsating brake application to forestall possible wheel sliding.

Another object of my invention is to provide inexpensive brake control apparatus of simple construction which can be adjusted at the will of the operator to provide selectively an automatic pulsating brake application for slippery road surfaces and a normal sustained brake application for dry road surfaces.

These objects and other objects and advantages will become apparent from the following detailed description of the invention and from the accompanying drawing, in which the single figure shows, partly in outline and partly in section, a portion of a hydraulic brake control apparatus embodying the invention.

Description

As shown in the drawing, the brake control apparatus is applied to a hydraulic type of automotive brake system comprising the usual hydraulic master cylinder 1 filled with hydraulic brake fluid at a threaded cap 2. This master cylinder comprises a piston (not shown) connected to a piston rod 3 which is positioned by movement of a foot-operated brake pedal 4 having a pedal arm or lever 5 pivotally mounted on a pivot pin 6 that is carried by the vehicle frame or a member (not shown) rigidly connected to said frame. Movement of the pedal 4 to the left (as shown in the drawing) causes the bottom portion of the pedal arm 5 to move to the right. Pedal arm 5 is pivotally connected to the piston rod 3 and causes movement of the piston rod 3 to the right to first close off the connection of the usual brake fluid reservoir (not shown) of the master cylinder and then causes the brake piston to force brake fluid in the master cylinder under pressure into the usual brake line 8 leading to the brake cylinders (not shown) to effect operation of the usual wheel brakes (not shown).

According to the invention, the brake control apparatus just described is modified by the provision of a diaphragm piston device 9, a control valve 10, a pipe 11 connecting said device 9 and valve 10, and a manually operable cut-off valve 12 connected to said control valve 10 and to a vacuum reservoir 13 by pipes 14 and 15, respectively. The intake manifold of the vehicle engine may be utilized as the vacuum reservoir 13, or a reservoir separate from the manifold may be provided. The control valve 10 is connected to the normal hydraulic brake line 8 by a branch line 16.

The diaphragm piston device 9 consists of two body portions 17 and 18 secured together by a plurality of bolts 19, two of which are shown. The body portion 18 is suitably secured to the vehicle frame or to a member (not shown) rigidly connected to said frame. A chamber 20 is formed within said device 9 by the body portion 17 and a diaphragm piston 21. The diaphragm piston 21 is connected to the piston rod 3 through a lost-motion connection comprising a follower 22 having an enlarged portion 23 and an elongated opening 24 therein into which a pin 7 on the bottom portion of pedal arm 5 extends. A limited degree of sliding movement of said pin 7 relative to follower 22 occurs upon initial depression of the pedal 4, before pin 7 engages the right end of the opening 24. The follower 22 extends through a chamber 25 formed in said device 9 between the body portion 18 and the diaphragm piston 21, said chamber being constantly connected to atmosphere through the opening in the wall of the body portion 18 through which follower 22 extends. The diaphragm piston 21 may, for sake of illustration, comprise a flexible diaphragm 26 and a non-flexible dish-shaped backing plate 27, secured together as shown.

The control valve 10 comprises a casing 28 having two chambers 29 and 30 separated by a diaphragm piston 31. Chamber 29 is subject to the hydraulic brake fluid pressure in branch line 16. Chamber 30 is subject to sub-atmospheric or vacuum pressure applied to said chamber from the vacuum reservoir 13 via pipes 15 and 14 under the control of the cut-off valve 12. A spring 32 located in chamber 30 biases the diaphragm piston 31 rightward to a normal position, in which it is shown, against the combined resistance of sub-atmospheric pressure in chamber 30 and hydraulic brake fluid pressure in chamber 29. When, however, pressure of fluid in chamber 29 exceeds a predetermined value, corresponding to the maximum brake fluid pressure at which the brakes may be applied without effecting wheel sliding on low-adhesion road surfaces, the diaphragm piston 31 will be shifted leftward to a releasing position, against resistance of spring 32, by the combined effects of the sub-atmospheric pressure in chamber 30 and the said predetermined maximum brake fluid pressure in chamber 29.

A piston follower 33, suitably conjoined at one end with the diaphragm piston 31 and fluted adjacent the opposite end, extends through the chamber 30 and at its fluted end is suitably attached to a double-seating valve 34. When piston 31 is in releasing position, the double-seating valve 34 is held seated on a tapered annular valve seat 36 surrounding an atmospheric port 37, and said valve 34 is unseated from an oppositely arranged tapered annular valve seat 38 for establishing a connection between pipes 11 and 14 via the fluted portion of follower 33 and chamber 30. When piston 31 is in normal position, valve 34 is seated on valve seat 38 for disestablishing the connection between pipes 11 and 14 and connecting pipe 11 to atmosphere via port 37.

The cut-off valve 12 shown in the drawing partly in section is of standard construction having a handle 39 to position a tapered valve element 40 within a valve casing 41 such that communication between pipes 14 and 15 is established in an "On" position or closed off in an "Off" position according to the positioning of the handle 39. A choke 42 located, such as in the valve element 40, restricts communication between pipes 14 and 15 when the handle 39 is in the "On" position, for reasons hereinafter explained.

Operation

To operate the brake control apparatus when travelling on low-adhesion road surfaces, the operator must first move the handle 39 of the cut-off valve 12 to the "On" position, in which position the vacuum reservoir 13 is connected to chamber 30 of the control valve 10 by way of pipe 15, a port 43 through the valve casing 41 and valve element 40, choke 42, and pipe 14. With the cut-off valve 12 so positioned, the apparatus is conditioned to provide a pulsating braking when a brake application is made in the manner presently described.

To make a brake application, the operator applies foot pressure to the brake pedal 4 to rock the pedal arm 5 about pivot pin 6 to first cause movement of the connecting pin 7 to the right within the opening 24 (as viewed in the drawing), until said pin engages the right wall of said opening 24, movement of the piston rod 3 to the right during this interval being such as to close off the connection between the usual fluid reservoir and the master cylinder before fluid braking forces are initially applied to the brake line 8, branch pipe 16 and connected brake cylinders (not shown) to apply the brakes. Further foot-applied pressure on the pedal 4 effects further movement to the right of the piston rod 3 to effect increased fluid braking pressure in the usual manner, and also causes the pin 7 now engaged with the right wall of the opening 24, to pull the follower 22 and connected diaphragm piston 21 to the right.

The fluid brake pressure may be increased by increasing foot-applied pressure on the pedal 4 until a maximum safe fluid brake pressure is attained. This maximum fluid brake pressure is normally the pressure slightly less than that at which wheel slip begins to occur. When the predetermined maximum fluid brake pressure is attained, the fluid brake pressure transmitted through pipe 16 to the chamber 29 of the control valve 10 acts cooperatively with the sub-atmospheric pressure in chamber 30 to overcome the pressure of spring 32 and move the diaphragm piston 31 leftward to its releasing position, in which position valve 34 is unseated from the seat 38 and is seated on valve seat 36. Under this condition, pipe 11 is closed off from the atmospheric port 37, and vacuum or sub-atmospheric pressure in the vacuum reservoir 13 is effective in chamber 20 of the diaphragm piston device 9 by way of pipe 15, port 43 and choke 42 in the cut-off valve 12, pipe 14, chamber 30 of control valve 10, and pipe 11; whereupon atmospheric pressure in chamber 25 will act on the diaphragm piston 21 in opposition to the sub-atmospheric pressure now established in chamber 20 for causing the diaphragm piston and hence the follower 22 to be shifted leftward in opposition to the foot-applied pressure, for thereby effecting movement of the pin 7, piston rod 3 and follower 22 to the left to cause a reduction of fluid brake pressure in the brake line 8 and connecting brake cylinders (not shown), and thus relieving the degree of brake application on the wheels.

This reduction in fluid brake pressure in the brake line 8 is transmitted via pipe 16 to chamber 29 of the control valve 10, thereby enabling the spring 32 to move the diaphragm piston 31 to the right to its normal position. During this rightward movement of diaphragm piston 21, valve 34 will be successively unseated from valve seat 36 and then seated on valve seat 38 for connecting pipe 11 to atmosphere and cutting off pipe 11 from the vacuum reservoir. With pipe 11 and hence the chamber 20 opened to atmosphere by way of port 37, the fluid pressure forces on the diaphragm piston 21 will be balanced and thus the pull on follower 22 will be removed such that the only force remaining is the force exerted by the foot-applied pressure on pedal 4 through pedal arm 5 at the connecting pin 7, which foot-applied pressure will cause reestablishment of the fluid brake pressure in the brake line 8, connected brake cylinders (not shown) and branch pipe 16, as determined by the degree of foot-applied pressure on pedal 4, in the manner already explained.

It will thus be seen that, if and when the fluid brake pressure reaches the aforementioned predetermined maximum value, the control valve 10 will operate to cause the diaphragm piston device 9 to effect a reduction in fluid brake pressure; that this reduction in fluid brake pressure will, in turn, cause the control valve 10 to operate to cause the diaphragm piston device 9 to effect a reestablishment of the original fluid brake pressure called for by foot-applied pressure on the pedal 4; and that these alternate reductions and increases in fluid brake pressure will result in a pulsating fluid brake pressure. The frequency of such fluid pressure pulsations is determined by the rate of application of the sub-atmospheric pressure to chamber 20 which, in turn, is determined by the orifice size of the choke 42. The pulsating fluid brake pressure is transmitted to the brake cylinders (not shown) through the brake fluid without materially changing the foot pressure applied to the brake pedal 4; however, a slight fluttering or pulsating force may be detected in the brake pedal which will serve only to inform the operator of the pulsating action of the brakes without having any detrimental effect.

A brake release is accomplished by releasing the foot-applied pressure on the brake pedal 4 such that the fluid brake pressure in the brake line 8, branch line 16 and the brake cylinders (not shown) is relieved. Upon release of fluid brake pressure in branch line 16, the spring 32 of the control valve 10 will return the diaphragm piston 31 and follower 33 to the left to its normal position and thereby cause the valve 34 to seat on the seat 38 and be unseated from the seat 36 to vent the pipe 11 and chamber 20 to terminate the pulsating braking. Of course, by relieving the foot-applied pressure on pedal 5 to a degree calling for less than the aforementioned predetermined maximum value of fluid braking pressure, the pulsating braking will also be terminated and brakes will be applied to a degree corresponding to the foot-applied pressure. The pulsating braking will thus be effective only when the operator tends to over-apply the brakes beyond the predetermined safe pressure for low-adhesion road surfaces.

When operating on dry road surfaces, the operator should position the handle 39 of the cut-off valve 12 in its "Off" position, in which communication between the vacuum reservoir 13 and the control valve 10 is cut off. With the supply of sub-atmospheric pressure from vacuum reservoir 13 thus cut off, operation of control valve 10 responsively to braking pressure in branch line 16 does not cause unbalance of fluid pressure forces on diaphragm piston 21. Consequently the diaphragm piston is rendered ineffective to exert any force in opposition to the operator-exerted braking force on pedal 4 and the automatic pulsation of the braking force is thereby prevented. In this case, the brake apparatus functions in well-known manner simply as a pedal-operated hydraulic brake system.

Having now described the invention, what I claim as new and desire to secure by Letters Patent, is:

1. A pulsating brake apparatus comprising a master cylinder, pedal-operated lever means for exerting a brake-applying force to piston means in said master cylinder to create a braking fluid pressure, a source of supply of fluid under sub-atmospheric pressure, movable abutment means selectively subject to atmospheric or said sub-atmospheric fluid pressure in a chamber on one side thereof and an opposing constant atmospheric pressure on the opposite side thereof, force transmitting means for connecting said movable abutment means to said pedal-operated lever means, said movable abutment means being operative to exert a force via said force transmitting means corresponding to the differential between the fluid pressure in said chamber and said constant atmospheric pressure in opposition to the brake-applying force exerted by said pedal-operated lever means to thereby effect a reduction in braking fluid pressure, and control valve means operative responsively to a predetermined braking fluid pressure developed in said master cylinder by force applied to said pedal-operated lever means for effecting the supply of sub-atmospheric pressure from said source to said chamber thereby to cause said movable abutment means to effect a reduction of braking fluid pressure in said master cylinder below said predetermined braking fluid pressure, said control valve means being operative responsively to said reduction in braking fluid pressure in said master cylinder below said predetermined braking fluid pressure to effect a supply of atmospheric pressure to said chamber thereby decreasing the differential force acting on said movable abutment means in opposition to the brake-applying force exerted on said pedal-operated lever means and effecting a restoration of the braking fluid pressure to that corresponding to the force acting on said pedal-operated lever means.

2. A pulsating brake apparatus comprising a master cylinder, pedal-operated lever means for exerting a brake-applying force to piston means in said master cylinder to create a braking fluid pressure, a source of supply of fluid under sub-atmospheric pressure, movable abutment means selectively subject to atmospheric or sub-atmospheric pressure of fluid in one chamber on one side thereof and a constant opposing atmospheric pressure of fluid in a second chamber on the opposite side thereof, linking means connecting said movable abutment means and said pedal-operated lever means, said movable abutment means being operative upon a supply of sub-atmospheric pressure of fluid to said one chamber to cause a force to be exerted in opposition to the brake-applying force exerted by said pedal-operated lever means so as to effect a reduction in braking pressure, no force being exerted through said linking means by said movable abutment means in opposition to the brake-applying force exerted by the pedal-operated lever means upon equalization of the pressure in said one chamber with said constant atmospheric pressure, and control valve means controlled by pressure of fluid in said master cylinder and operative to effect, alternately, first equalization of atmospheric pressures in said one chamber and said second chamber and then a supply of sub-atmospheric pressure to said one chamber accordingly as the braking pressure created in said master cylinder is less than or exceeds a predetermined pressure.

3. The combination according to claim 2 further including a lost-motion connection forming part of said linking means whereby an initial limited degree of force may be applied by said pedal-operated lever means without effect on said movable abutment means.

4. A pulsating brake apparatus for a hydraulic brake system, said apparatus comprising a master cylinder, piston rod means, pedal-operated lever means mechanically connected to said piston rod means for applying a force thereto for causing said piston rod means to move in one direction to effect an increase in hydraulic pressure developed in said master cylinder thereby increasing braking pressure, a source of supply of fluid under sub-atmospheric pressure, movable abutment means selectively subject on one side to fluid under atmospheric pressure or sub-atmospheric pressure and on the opposite side to fluid at constant atmospheric pressure and operably connected to said piston rod means, said movable abutment means being effective or ineffective to apply a force to said piston rod means tending to move the latter and thereby the said pedal-operated lever means in a direction opposite to said one direction for causing a reduction in said hydraulic pressure thereby decreasing or restoring braking pressure according to whether fluid pressure on said one side of said movable abutment means is sub-atmospheric and less than the said opposing fluid at constant atmospheric pressure or is atmospheric and equal to said opposing fluid at constant atmospheric pressure, and control valve means controlled by hydraulic pressure developed in said master cylinder by force applied by said pedal-operated lever means and operative to effect a supply of fluid at sub-atmospheric pressure from said source to said one side of said movable abutment means or the supply of atmospheric pressure to said one side of said movable abutment means, according to whether hydraulic pressure developed in said master cylinder exceeds or is less than a predetermined value, respectively, thereby to cause said movable abutment means to alternately effect reduction and restoration of braking pressure as determined by the force exerted on the pedal-operated lever means.

5. A pulsating brake apparatus comprising a master cylinder having a supply of hydraulic fluid and connectable to a brake controlling pipe leading from said master cylinder for controlling brakes according to the hydraulic pressure established in said master cylinder, pedal-operated lever means manually operable to exert a brake-applying force to said hydraulic fluid in said master cylinder to create a braking fluid pressure in said brake controlling pipe, a source of fluid at sub-atmospheric pressure, movable abutment means selectively subject to fluid at atmospheric or sub-atmospheric pressure in a chamber on one side thereof, and subject to a constant atmospheric pressure on the opposite side thereof, mechanical means connecting said movable abutment means and said pedal-operated lever means, said movable abutment means being operable to exert a force via said mechanical means corresponding to the differential between the fluid pressure forces acting on said movable abutment means when fluid at sub-atmospheric pressure is in said chamber to act in opposition to the brake-applying force exerted by said pedal-operated lever means to effect a reduction in braking fluid pressure in said brake controlling pipe, and control valve means operative responsively to a predetermined braking fluid pressure developed in said master cylinder by force applied to said pedal-operated lever means to effect supply of fluid at sub-atmospheric pressure from said source to said chamber thereby to create a differential force acting on said movable abutment means to cause said movable abutment means to effect a reduction of braking fluid pressure in said brake controlling pipe below said predetermined braking fluid pressure, said control valve means being operative responsively to said reduction in braking fluid pressure in said master cylinder below said predetermined braking fluid pressure to effect a supply of fluid at atmospheric pressure to said chamber on one side of said movable abutment means thereby nullifying the differential force acting on said movable abutment means and rendering said movable abutment means ineffective to exert via the mechanical means a force opposing the brake-applying force exerted by the pedal-operated lever means and thereby effecting restoration of said braking fluid pressure to a degree corresponding to the force manually exerted on said pedal-operated lever means.

6. The combination according to claim 5, and further including flow restricting means interposed between said source and said chamber for controlling the rate at which the sub-atmospheric pressure is supplied to said chamber to thereby control the rate at which the differential force acting on the movable abutment means is developed and correspondingly the frequency at which the braking fluid pressure in the master cylinder is alternately increased and decreased.

7. The combination according to claim 5 further characterized by valve means selectively operable from one position in which it establishes communication through which sub-atmospheric pressure may be supplied from said source to said chamber at one side of said movable abutment to a cut-off position preventing the supply of sub-atmospheric pressure from said source to said chamber, thereby preventing development of a differential force of fluid pressures acting on said movable abutment notwithstanding operation of said control valve means.

References Cited in the file of this patent
UNITED STATES PATENTS
2,270,585    Gartner    Jan. 20, 1942